United States Patent [19]

Charles

[11] 4,061,794
[45] Dec. 6, 1977

[54] METHOD FOR FORMING BLOCKS OF NATURAL CHEESE FROM CHEESE CURD

[75] Inventor: George Kenneth Charles, Wincanton, England

[73] Assignee: Wincanton Engineering Limited, London, England

[21] Appl. No.: 672,953

[22] Filed: Apr. 2, 1976

[30] Foreign Application Priority Data

Apr. 4, 1975 United Kingdom .............. 14002/75

[51] Int. Cl.$^2$ ........................................... A23C 19/02
[52] U.S. Cl. ..................................... 426/486; 426/478; 426/491; 426/517; 100/37
[58] Field of Search ............... 426/512, 487, 486, 491, 426/389, 495, 478, 517, 396, 130, 414, 413, 515, 454, 582; 100/126, 37, 127

[56] References Cited

U.S. PATENT DOCUMENTS

| 27,845 | 4/1860 | Taft | 100/127 X |
|---|---|---|---|
| 32,820 | 7/1861 | Codding | 100/127 X |
| 3,098,747 | 7/1963 | Dubil | 426/486 X |
| 3,468,026 | 9/1969 | Robertson et al. | 426/491 X |
| 3,541,686 | 11/1970 | Koopmans | 426/512 X |
| 3,859,453 | 1/1975 | Bronkhorst et al. | 426/491 X |
| 3,891,783 | 6/1975 | Robertson et al. | 426/491 X |
| 3,987,209 | 10/1976 | Gatineau et al. | 426/396 |

Primary Examiner—S. Leon Bashore
Assistant Examiner—Kenneth M. Schor
Attorney, Agent, or Firm—Browdy and Neimark

[57] ABSTRACT

Crumbled cheese curd is fed into the top of a hollow column in a chamber maintained at a sub-atmospheric pressure so as to form in the column a pillar of curd devoid of air pockets. The curd in the lower portion of the pillar being compressed by the weight of superimposed curd to press out whey therefrom and consolidate the curd, and the pillar of curd is repeatedly lowered, the bottom end of the pillar severed to form a block of cheese, and fresh curd added to the top of the pillar. During the lowering of the pillar of curd, the top of the pillar is subjected to a higher pressure than that acting on the bottom of the pillar so that the differential pressure exerts a force on the top of the pillar urging the pillar downwards and prevents fracture of the pillar due to frictional resistance with the walls of the column. The curd is fed into the chamber through a feedpipe connected between the top of the chamber and the outlet of a hopper containing curd under atmospheric pressure, the differential pressure between the hopper and the chamber causing curd to flow along the feedpipe. The feedpipe discharges into a cyclone separator in the top of the chamber for separating air from the curd.

5 Claims, 2 Drawing Figures

METHOD FOR FORMING BLOCKS OF NATURAL CHEESE FROM CHEESE CURD

BACKGROUND OF THE INVENTION

This invention relates to cheese-making, and is concerned more particularly with the formation of blocks of compressed natural cheese from cheese curd.

An increasing volume of cheese is being manufactured commercially by crumbling cheese curd in a mill, mixing the curd with salt, compressing the prepared curd to expel whey and air and cause the particles of curd to fuse together and form a block of natural cheese, wrapping the block in impervious sheet material, and then maturing the cheese under pressure. Previously the conventional method of forming the prepared cheese curd into blocks of natural cheese was by compressing the curd in individual moulds, but the filling, weighing, compressing and emptying of each mould is a time-consuming operation, and a large number of moulds and presses are required for large scale production.

In U.S. Pat. Specification No. 3,468,026 there is described and claimed a method of compressing crumbled cheese curd to consolidate the curd into cheese blocks, comprising forming the crumbled curd into a pillar in a chamber maintained at a sub-atmospheric pressure so that the curd in the lower portion of the pillar is compressed by the weight of superimposed curd to press out whey therefrom and consolidate the curd, removing the whey from the chamber, feeding crumbled curd into the chamber and onto the top of the pillar, lowering the pillar in the chamber and severing the lower end of the pillar to form a block of cheese, and removing the block of cheese from the chamber. The apparatus described in the above mentioned specification for carrying out this method comprises a hollow column mounted in the chamber, the pillar of curd being formed by filling the inside of the column with crumbled curd and the pillar being lowered by first supporting the pillar on a platform and then lowering the platform to slide the lower end of the pillar out of the column. In the operation of this apparatus it was found that the frictional resistance between the pillar of curd and the walls of the column was sometimes high enough to cause fractures in the pillar when it was lowered in the column.

SUMMARY OF THE INVENTION

According to the present invention there is provided a method of forming blocks of cheese from crumbled cheese curd, comprising feeding the crumbled curd into a chamber maintained at a sub-atmospheric pressure so as to form a pillar of curd in the chamber, the curd in the lower portion of the pillar being compressed by the weight of superimposed curd to press out whey therefrom and consolidate the curd, lowering the pillar, severing the lower end of the pillar to form a block of cheese and continuing the feeding, lowering and severing operations, characterised in that, during the lowering of the pillar of curd, the top of the pillar is subjected to a higher pressure than that acting on the bottom of the pillar so that the differential pressure exerts a force on the top of the pillar urging the pillar downwards.

During the lowering of the pillar of curd, whey and air may be extracted from the lower end of the chamber while a restricted flow of air is admitted into the upper end of the chamber to establish the differential pressure. The pillar of curd can conveniently be lowered so that its bottom end passes into a second chamber below the first chamber, the pressure in the second chamber being lower than that in the first chamber during the period in which the pillar is lowered.

In the method of the invention the pillar of curd can be lowered without risk of fracture of the pillar by selection of a suitable differential pressure, the minimum value for which will depend on the variety of cheese being made and the closeness of the body of the cheese.

During the formation of the pillar of curd the absolute pressure in the chamber would also depend on the variety of cheese being made and the closeness of the body of the cheese. By the use of a suitable low pressure within the chamber, almost all the air can be removed from the curd before it is compressed in the pillar, so that the blocks of cheese will be free of air pockets.

The crumbled curd can conveniently be fed into the chamber through a feed pipe one end of which opens into the chamber and the other end of which is connected to the outlet of a hopper for storing the curd at or above atmospheric pressure. When the chamber is at the sub-atmospheric pressure, the differential pressure acting on the curd in the feed pipe will cause the curd to flow along the pipe from the hopper into the chamber.

The blocks of cheese manufactured by the method of the invention are in a condition suitable to be wrapped in impervious sheet material and matured under pressure. It is, of course, to be understood that the crumbled curd has previously been mixed with salt and any other desired additive and the term curd is used herein to denote the mixture used for making cheese.

The blocks of cheese are preferably further compressed after being severed from the lower end of the pillar, in order to overcome the elasticity of the particles of curd and produce a smoother outer surface to the block of cheese.

According to the present invention there is also provided apparatus for forming blocks of cheese from crumbled cheese curd, comprising a chamber, vacuum means for maintaining the chamber at a sub-atmospheric pressure, means for introducing crumbled cheese curd into the upper end of the chamber to form a pillar of curd therein while the chamber is maintaind at said sub-atmospheric pressure, means for removing whey expressed from the lower end portion of the pillar of curd due to weight of curd superimposed thereon, means for severing the lower end of the pillar to form a block of cheese, and means for removing the block from the chamber and lowering the pillar of curd within the chamber, characterised in that said vacuum means are operable to maintain a higher pressure in the upper portion of the chamber than in the lower portion thereof during the lowering of the pillar of curd within the chamber whereby the differential pressure exerts a force on the top of the pillar urging the pillar downwards.

BRIEF DESCRIPTION OF THE DRAWING

One construction of apparatus suitable for carrying out the method of the invention will now be described, by way of example, with reference to the accompanying drawings, in which.

DETAILED DESCRIPTION OF EMBODIMENT

Figure 1:
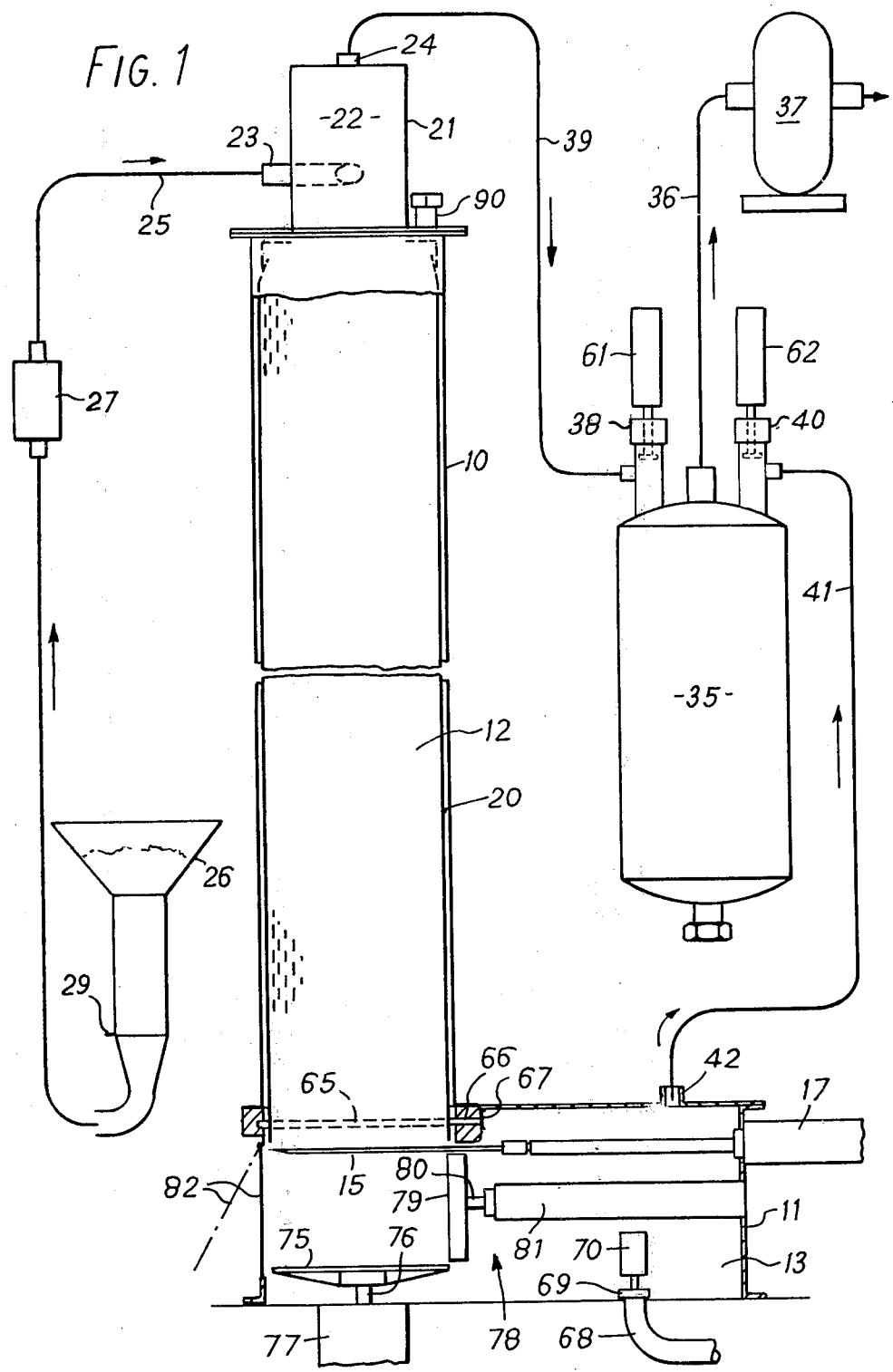
FIG. 1 is a diagrammatic view of the apparatus.

Referring to FIG. 1, the apparatus comprises a hollow casing 10 of rectangular section mounted vertically on a hollow casing 11, the lower end of the casing 10 opening into the interior of the casing 11. The interior of the casing 10 forms an upper vacuum chamber 12 and the interior of the casing 11 forms a lower vacuum chamber 13. A guillotine blade 15 is mounted in guides (not shown) on the lower end of the casing 10, within the chamber 13, the blade being movable by a piston and cylinder motor 17 between a closed position in which it seals off the upper chamber 12 from the lower chamber 13, and an open position in which it is withdrawn wholly clear of the lower end of the upper chamber.

A thin-walled tubular column 20 of rectangular section is mounted in the upper chamber 12 with its lower end spaced close to the guillotine blade 15, when in the closed position, and a cyclone separator 21 is mounted on the upper end of the column and projects upwards through an opening in the top of the casing 10, the cyclone separator being a fluid tight fit in the opening in the casing. The walls of the column 20 are perforated and co-operate with the casing 10 to form therebetween a space for drainage of liquid. The walls of the column can conveniently be formed by perforated liners on the inside wall of the casing 10. The liners may consist of thin stainless steel sheets, each sheet having small elongated strips punched out of the plane of the sheet to form two narrow slots on each side of each strip with the ends of the strips merging smoothly into the body of the sheet, as described in my United States patent application Ser. No. 672,954 filed Apr. 2, 1976. Such strips may be approximately ⅜ of an inch long and 1/16 of an inch wide with the strips one inch apart in rows, the strips in each row being staggered relative to the strips in the adjacent row. The sheets are arranged so that the strips are vertical and project from the outside surfaces of the sheets. The inside surfaces of the walls of the column 20 are thus smooth and unobstructed by any inwardly extending projections, and the strips space the body of the sheet from the casing 10 to provide the drainage space.

The cyclone separator is for use in feeding curd into the column 20 and comprises an upright cylindrical chamber 22 and a curd inlet pipe 23 which opens into the chamber 22 tangentially through the wall thereof. The bottom of the chamber 22, which opens into the interior of the column 20, is fitted to a rectangular section adapted to fit on a tapered mouth on the top of the column. The top of the chamber 22 has an outlet 24 through which air can be evacuated from the separator and the column.

The curd inlet pipe 23 is connected by a flexible pipe 25 to the outlet of a hopper 26 for storing curd to be fed to the column, the pipe 25 containing a valve 27 for controlling feed of the curd. The hopper is fitted at the lower end thereof with a sensing probe 29 adapted to provide a signal when curd in the hopper drops below a predetermined level. The valve 27, which is of known construction, comprises a cylindrical casing fitted internally with a rubber tube which forms the through passage for the valve, the rubber tube being collapsible to control flow of material through the valve upon supply of air under pressure to the chamber formed between the outer casing and the rubber tube. Control mechanism supplies compressed air to the valve to close the same in response to the signal issued by the probe when the curd is below the predetermined level in the hopper.

Figure 2:
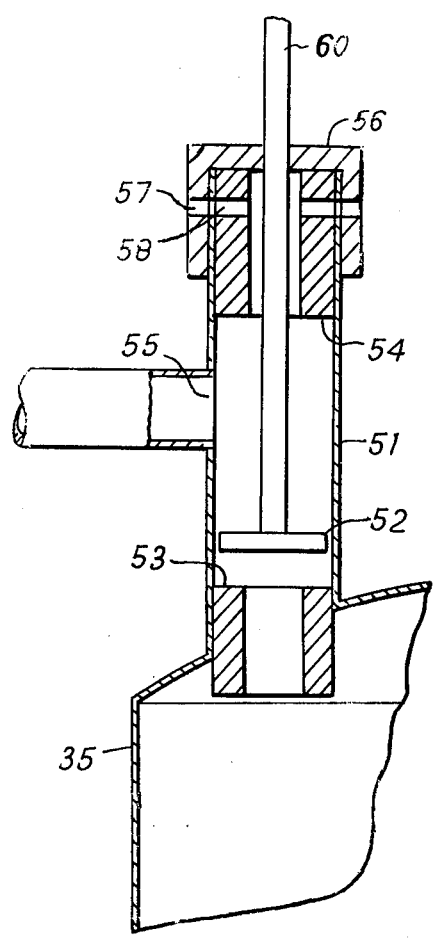
FIG. 2 is a sectional view of a vacuum control valve of the apparatus.

A large vacuum reservoir 35 is connected directly by a pipe 36 to a power driven exhauster 37 operable to maintain the reservoir at a high vacuum, and the reservoir is also connected through a control valve 38 and a pipe 39 to the air outlet 24 of the cyclone separator 21 and through a control valve 40 and a pipe 41 to an air outlet 42 for the lower chamber 13. The two control valves 38, 40 are of identical construction and as shown in FIG. 2 each comprises a cylinder 51 and a valve piston 52 adapted to make sealing engagement selectively with valve seats 53, 54 at the lower and upper ends respectively of the cylinder, the center portion of the cylinder having a port 55 connected to the pipe 39 or 41, the lower end of the cylinder being connected to the vacuum reservoir through the valve seat 53, and the upper end of the cylinder being connected to atmosphere through the valve seat 54. The upper end of the cylinder 51 is fitted with a cap 56 having a plurality of ports 57 adapted to be aligned with ports 58 in the cylinder wall, the ports 57 being graduated in size so that the rate of flow of air through the valve seat 54 can be regulated by angular adjustment of the cap. The valve piston 52 is secured to a piston rod 60 which extends through the valve seat 54 and through an aperture in the cap 56 and is connected to an air motor operable to move the piston 52 alternately against the valve seats 53, 54 so that the port 55 is connected to the vacuum reservoir when the piston is engaged against the valve seat 54 and the port 55 is connected to atmosphere through ports 57, 58 when the piston is engaged against the valve seat 53. As shown in FIG. 1, the air motor for operating control valve 38 is designated 61 and the air motor for operating control valve 40 is designated 62.

The lower end of the casing 10 has a drainage manifold 65 which communicates with the space between the column 20 and the casing 10, and a drain passage 66 from the manifold opens into the chamber 13 through a flap valve 67 designed to prevent flow of fluid from the lower chamber into the upper chamber when the pressure in the lower chamber is greater than that in the upper chamber. The bottom wall of the casing 11 is fitted with a drain passage 68 controlled by a valve 69 actuated by a piston and cylinder motor 70.

The lower chamber 13 is provided with a platform 75 positioned directly below the column 20. The platform is mounted on the piston rod 76 of a vertical piston and cylinder motor 77 operable to raise and lower the platform. The lower chamber is also provided with an ejector 78 consisting of a flat plate 79 mounted on the end of a piston rod 80 of a horizontal piston and cylinder motor 81 operable to move the disc across the platform so as to eject a block of cheese thereon through a door 82 in the end wall of the lower casing 11.

At the start of an operational cycle of the apparatus, the curd feed pipe 25 is closed by valve 27, the upper chamber 12 is sealed from the lower chamber 13 by the guillotine blade 15 which is in the closed position shown in FIG. 1, the door 82 in the casing 11 is closed, the drain passage 68 in the lower casing 11 is closed by valve 69, the control valves 38, 40 are each set so that their valve pistons 52 are engaged against the upper valve seats 54 so that both the chambers 12, 13 are connected to the vacuum reservoir 35, and the exhauster 37 is driven to evacuate air from the reservoir and the two chambers 12, 13. The hopper is filled with a mixture of crumbled cheese curd and salt.

When a high vacuum is obtained in the two chambers 12, 13, the valve 27 is opened so that the difference between the low pressure in the chamber 12 and the comparatively high atmospheric pressure acting on the curd in the hopper causes the curd to flow up the pipe 25 and into the cyclone separator 21. The mass of curd in the hopper and pipe provides sufficient restriction to entry of air through the pipe into the chamber 12 to enable the vacuum to be maintained therein. In the event of the level of curd in the hopper falling below a predetermined level, the probe 29 actuates the valve 27 to close the curd feed pipe as explained above.

The curd entering the cyclone separator is of course immediately subjected to the low pressure therein and some of the moisture in the curd is "flashed off" into vapour and withdrawn from the separator, together with air entering with the curd, through the pipe 39. Since the inlet pipe 23 opens tangentially into the cylindrical chamber 22 of the separator, the curd tends to travel around the wall of the chamber 22 before it falls into the chamber 12, and the air and moisture vapour tend to flow into the center of the chamber 22 where it is subjected to the updraught caused by evacuation of air through the pipe 39. There is thus little risk of any of the curd being drawn upwards into the pipe 39 by the current of air through the separator.

The crumbled curd falls from the separator into the column 20 and builds up into a pillar of curd supported on the guillotine blade 15. The weight of curd in the column compresses the curd at the lower end and forces whey out of the curd, the whey passing through the slots in the walls of the column into the space between the column and the casing 10 and the whey then draining into the manifold 65. The column is provided with control mechanism operable to close the valve 27 to cut off the supply of curd whenever the pillar of curd reaches a predetermined height.

When the pillar of curd has reached the predetermined height, the platform 75 in the lower chamber 13 is raised to a position in which it is immediately below the guillotine blade 15 and the motor 61 of control valve 38 is operated to move the valve piston from the upper seat 54 into engagement with the lower seat 53 and thereby permit air to flow through the pipe 39 into the chamber 12. The resulting increase in pressure in the chamber 12 compresses and consolidates the curd in the pillar. Since the build-up of the pillar took place at low pressure, there is little or no air inside the pillar and the curd has a compact structure without cavities. The rise in pressure in the chamber 12 also forces the whey in the manifold 65 out of the drain passage 66 and flap valve 67 into the chamber 13 which is still maintained at the low pressure existing in the vacuum reservoir 35. When the whey in the manifold 65 has been expelled into the chamber 13, air in the upper chamber 12 flows continuously down between the walls of the column 20 and the casing 10, through the flap valve 67 into the chamber 13, and is then evacuated from chamber 13 through the pipe 41 and vacuum reservoir 35. This flow of air sweeps moisture from the slots in the walls of the column 20 and has a drying effect on the curd in the column.

The blade is then withdrawn so that the pillar of curd within the column slides down on to the platform. The platform, together with the pillar of curd, is then lowered slowly by the motor 77 to the position shown in FIG. 1. During the downward movement of the platform the pillar of curd is forced downwards against the platform by the air pressure in chamber 12 which is considerably higher than the air pressure in chamber 13. This downward pressure on the pillar of curd ensures that there is no risk of the pillar of curd fracturing due to the frictional resistance between the curd and the walls of the column. When the platform is in its lowered position the guillotine blade is driven into its closed position as shown in FIG. 1, thereby severing a block of curd from the lower end of the pillar of curd. Although the curd in the block has been compressed by the weight of the superimposed curd in the column and by the increased pressure of air in the column when connected to atmosphere, the block of curd is compressed further by forcing the platform upwards and compressing the block against the underside of the blade 15. The curd can thus be compressed to any desired degree by use of a suitable size of motor 77.

After compressing the block of curd for a predetermined time (for example 30-60 seconds), the platform is lowered to space the block from the blade 15, the control valve 40 is operated by the motor 62 to disconnect the pipe 41 from the vacuum reservoir and connect it instead to atmosphere. Also, the valve 69 is opened to increase the rate of supply of air to chamber 13. When the pressure in the chamber 13 has risen to atmospheric pressure, the block of curd is removed through the door 82 by the ejector 78. At this stage, whey which has entered the lower chamber 13 through the flap valve 67 drains away through the drain passage 68. The ejector is then retracted, the door 82 and the valve 69 are closed, the two control valves 38, 40 operated to connect the two chambers 12, 13 to the vacuum reservoir, and the cycle repeated.

It will of course be appreciated that the control valves and motors can be operated automatically in sequence by suitable control mechanism in each operational cycle of the apparatus.

After an extended period of operation, the whole interior of chambers 12, 13 and particularly the whey drainage area between the column 20 and the casing 10 becomes coated with fatty deposits and small particles of cheese curd which must be thoroughly removed.

Superficial removal of loose debris is achieved by feeding clean water into the hopper 26 while maintaining a vacuum in chambers 12 and 13 so that the water is drawn up through the pipe 25 into the separator and drains down the column.

A more thorough cleaning is obtained by pumping water to a connection 90 provided at the top of casing 10, the water descending between the column 20 and the casing 10, flowing past the open guillotine blade, and then collecting in the bottom of the chamber 13 from which it drains through the open valve 69 and drain passage 68 to waste. After all the loose debris has been flushed out, hot water containing a suitable detergent is pumped to the connection 90 as long as is necessary to thoroughly degrease the surfaces. Although the main flow of liquid takes place between the walls of the column 20 and the casing 10, a considerable amount is forced into the interior of the column through the drainage slots in the walls thereof, in addition to that which spills over the top of the walls of the column and in practice this results in effective cleansing of all surfaces. The cleaning operation is completed by pumping cold clear water to the connection 90 to remove all detergent.

What is claimed is:

1. In a method of forming blocks of cheese from crumbled cheese curd comprising feeding the crumbled curd into a chamber to form a pillar of curd in said chamber, the curd in the lower portion of said pillar being compressed by the weight of superimposed curd to press out whey therefrom and consolidate the curd, extracting air and whey from said chamber so as to maintain a sub-atmospheric pressure therein during feeding of the curd into the chamber whereby air introduced into the chamber with the curd is "flashed off" before the curd is deposited on the top of said pillar, lowering said pillar, severing the lower end of said pillar of curd to form a block of cheese and continuing the feeding, lowering and severing operations: the improvement comprising subjecting the bottom of said pillar to a lower gaseous pressure than the gaseous pressure acting on the top of said pillar during the lowering of the pillar of curd so that the resulting differential gaseous pressure exerts a force on said pillar of curd urging said pillar downwards.

2. A method as claimed in claim 1 wherein, during the lowering of the pillar, whey and air are extracted from the lower end of the chamber while a restricted flow of air is admitted into the upper end of the chamber to establish said differential pressure.

3. A method as claimed in claim 1 in which the pillar of curd is formed in a hollow column spaced with small clearance from the side walls of the chamber, the column having apertures in the walls thereof for passage of whey pressed out of the curd, wherein, during the lowering of the pillar, whey and air are extracted from the lower end of the space between the column and the chamber while a restricted flow of air is admitted into the upper end of the chamber to establish said differential pressure.

4. A method as claimed in claim 1 in which the pillar of curd is lowered so that its bottom end passes into a second chamber below the first chamber, wherein the pressure in the second chamber is lower than that in the first chamber during the lowering operation.

5. A method as claimed in claim 1, in which crumbled curd is stored in a hopper at a pressure greater than that in the chamber and the outlet of the hopper is connected to the chamber by a feed pipe, wherein the resulting differential pressure acting on the curd in the feed pipe is utilised to draw curd from the hopper into the chamber.

* * * * *